United States Patent
Kozlovski

(10) Patent No.: US 6,838,031 B2
(45) Date of Patent: Jan. 4, 2005

(54) METHOD AND MOLD FOR MANUFACTURE OF A SOLID MOLDED ARTICLE, AND A SOLID MOLDED ARTICLE MANUFACTURED ACCORDING TO THE METHOD

(75) Inventor: Albert David Kozlovski, Atkinson, NH (US)

(73) Assignee: Tyco Electronics Corporation, Middletown, PA (US)

( * ) Notice: Subject to any disclaimer, the term of this patent is extended or adjusted under 35 U.S.C. 154(b) by 427 days.

(21) Appl. No.: 10/103,086

(22) Filed: Mar. 21, 2002

(65) Prior Publication Data

US 2004/0155171 A1 Aug. 12, 2004

(51) Int. Cl.$^7$ .............................. B28B 5/00; B29C 47/00
(52) U.S. Cl. ...................... 264/241; 264/279; 264/303; 264/308; 156/244.25; 156/245
(58) Field of Search .............................. 156/242, 244.15, 156/244.25, 245; 264/167, 214, 241, 248, 271.1, 274, 279, 294, 303, 308

(56) References Cited

U.S. PATENT DOCUMENTS 5,529,742 A * 6/1996 Strapazzini ................. 264/511

OTHER PUBLICATIONS

Robert A. Malloy, Copyright Hanser Publishing, 1994 λPlastic Part Design for Injection Molding@, pp. 222, 223.

* cited by examiner

*Primary Examiner*—Donald J. Loney

(57) ABSTRACT

A method for molding a thick part without significant surface distortion is disclosed. A cavity mold having a first core mold portion with strakes is used to create a first molded form having ribs proportioned and spaced apart to prevent distortions on one surface of the part due to shrinkage. A second core mold portion replaces the first core mold portion for creation of a second molded form having complementary ribs which are similarly proportioned to prevent distortions in an opposite surface of the part. The first form acts as a mold for the second form, the complementary ribs fuse together and form a homogeneous mass between the opposite surfaces of the part.

10 Claims, 2 Drawing Sheets

METHOD AND MOLD FOR MANUFACTURE OF A SOLID MOLDED ARTICLE, AND A SOLID MOLDED ARTICLE MANUFACTURED ACCORDING TO THE METHOD

FIELD OF THE INVENTION

The invention concerns a method and a mold for economically manufacturing a solid molded article without significant shrinkage distortion, and an article molded according to the method, especially plastic articles used for optical or radio frequency lenses.

BACKGROUND AND OBJECT OF THE INVENTION

Mass production of articles such as lenses for refracting electromagnetic waves, for example, in the optical or radio frequency bandwidths, is feasible by means of molding techniques. Plastics, especially polycarbonates known under brand names such as Lexan and Plexiglas, are especially useful as dielectric lens components in active antennas for receiving and amplifying radio waves.

The ability of lenses to refract electromagnetic waves is largely dependent upon the electrical characteristics, at the atomic level, of the material comprising the lens, and the shape of the lens. The shape of the lens must be controlled to a high degree of accuracy to ensure that the desired refracting effects are achieved. A lens the shape of which is distorted by even a relatively small amount will perform poorly and may not be effective or useful in the system of which they are a part.

Lenses tend to be homogeneous solid bodies having portions of varying thickness, and the difficulties of accurately molding a desired shape of a relatively thick body are well known. Molded parts tend to shrink as the material cools and solidifies within the mold, and the rate of shrinkage is proportional to the volume of material present. Thus thicker portions of the lens, having greater volume of material, will tend to shrink at a greater rate than the thinner portions of the lens, which have less volume. The effects of such differential shrinkage is manifested by sink marks, which are localized depressed areas which appear on the surface of the lens above the thicker regions of the lens where the rate of shrinkage is greater. The sink marks distort the shape of the lens and adversely affect the refraction performance, often rendering the lens totally useless. While adjustments to the mold tooling can be used to compensate for some degree of differential shrinkage, it is not generally possible to achieve acceptable results for relatively thick body lenses through mold tooling adjustment alone.

Furthermore, the thickness of the molded lens will have a direct effect on the cycle time needed to produce the lens. The thicker the lens, the longer it takes to cool and solidify, the time for cooling increasing in geometric proportion to the mass of material. Thus as lenses become thicker the cycle time rapidly increases. This results in lower production rates which increase the production costs for thick lenses significantly. It is thus also difficult to mold a relatively thick lens economically.

There is clearly a need for a method to economically mold relatively thick lenses which do not suffer significant shape distortion and thus will have adequate refraction performance.

It is an object of the invention to provide a method of molding parts.

It is another object of the invention to provide a mold useable in a method for molding parts.

It is again another object of the invention to provide a molded part.

It is also an object of the invention to provide a method of molding parts which do not have surface distortions due to shrinkage.

It is yet another object of the invention to provide a mold useable in a method for molding parts which do not have surface distortions due to shrinkage.

It is again another object of the invention to provide a molded part which does not have surface distortions due to shrinkage.

It is still another object of the invention to provide a molded part suitable for use as a lens for refracting electromagnetic waves.

It is yet another object of the invention to provide a method for molding a part having reduced cycle time.

SUMMARY OF THE INVENTION

The invention concerns a method of molding a part from a moldable material. The method comprises the steps of providing a cavity mold portion having a first inner surface and first core mold portion engagable with the cavity portion. The first core portion has a plurality of strakes positioned in spaced relation to one another and oriented substantially perpendicularly to the first inner surface. The strakes have a free edge positionable in spaced relation to the first inner surface when the first core portion is engaged with the cavity portion. Further method steps include engaging the first core portion with the cavity portion to form a mold and filling the mold with the moldable material in a fluid form. The moldable material is allowed to harden and conform to the mold into a first form with a plurality of first ribs formed as complements of the strakes, the first ribs being integral with the first form and separated from one another by a plurality of spaces formed by the strakes. The first core portion is then removed and a second core mold portion engagable with the cavity portion is provided, the second core portion having a second inner surface. The second core portion is engaged with the cavity portion to form the mold. The mold is then filled with the moldable material in a fluid form, the moldable material filling the spaces thereby forming a plurality of second ribs and conforming to the second inner surface creating a second form integral with the second ribs.

The moldable material is again allowed to harden, the first and second ribs being fused to one another thereby joining the first and second forms together to form the part. The part is substantially homogeneous between the first and second surfaces. The second core portion is removed from the cavity portion and the part is then removed from the cavity portion.

The invention also concerns a molded part comprising a first form having a first surface facing outwardly from the part. The first form has a thickness measured generally perpendicularly to the first surface. A plurality of first ribs are integral with the first form and face inwardly of the part, the first ribs being arranged in spaced relation to one another and oriented substantially perpendicularly to the first surface. The part also comprises a second form having a second surface facing outwardly from the part. The second surface is substantially opposite to the first surface and has a thickness measured generally perpendicularly to the second surface. A plurality of second ribs are integral with the second form and face inwardly of the part, the second ribs being oriented substantially perpendicularly to the second surface and spaced apart so as to be complementary to the first ribs. The first and second ribs, being complementary, interfit with one another and substantially fill the part between the first and the second surfaces. The first and second ribs are fused to one another thereby joining the first and second forms together, the part being substantially homogeneous between the first and second surfaces.

The invention also contemplates a mold for manufacturing a molded part as described above by the method described above. The mold comprises a cavity portion having a first inner surface and a first core portion engagable with the cavity portion. The core portion has a plurality of strakes positioned in spaced relation to one another and oriented substantially perpendicularly to the first inner surface, the strakes each having a free edge positionable in spaced relation to the first inner surface when the first core portion is engaged with the cavity portion. The mold further comprises a second core portion, also engagable with the cavity portion, the second core portion having a second inner surface substantially facing the first inner surface when the second core portion is engaged with the cavity portion.

DETAILED DESCRIPTION OF PREFERRED EMBODIMENTS

Figure 1:
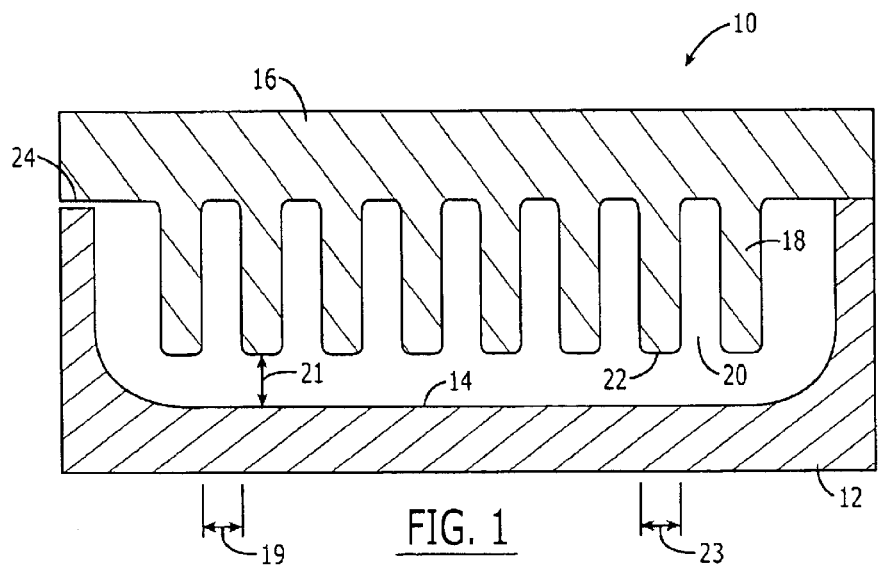
FIG. 1 is a cross sectional view of a mold according to the invention.

FIG. 1 is a cross sectional view of a mold 10 according to the invention. Mold 10 includes a cavity mold portion 12 with an inner surface 14 shaped as required to produce a surface of a molded part having the desired shape characteristics for its intended function. For example, if the molded part is a lens then inner surface 14 will be shaped so that the molded part, when formed, will have a surface that will properly refract electromagnetic waves as required.

Mold 10 further includes a first core mold portion 16 which is removably engagable with the cavity portion 12. First core mold portion 16 has a plurality of strakes 18 that extend into cavity mold portion 12. The strakes 18 are separated by spaces 20 and each has a free edge 22 positionable in spaced relation to the inner surface 14 when the core mold portion is engaged with the cavity mold portion. Preferably strakes 18 are spaced apart a distance 19 ranging between about 0.4 and about 0.8 times the perpendicular distance 21 between the free edges 22 and the inner surface 14. The thickness 23 of the strakes is preferably between about 2 and 3 times the distance 21 between the free edges 22 and the inner surface 14. The significance of these dimensions is explained in detail below. Mold 10 also includes a gate 24 for admitting moldable material in fluid form to the mold.

Figure 2:
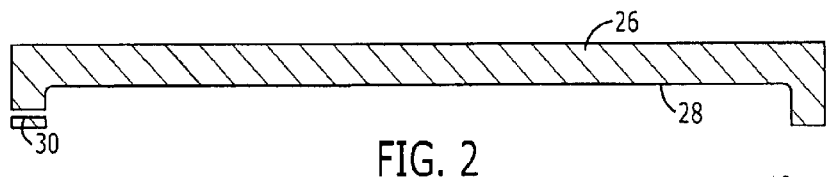
FIG. 2 is a cross sectional view of a core portion of a mold according to the invention.
Figure 3:
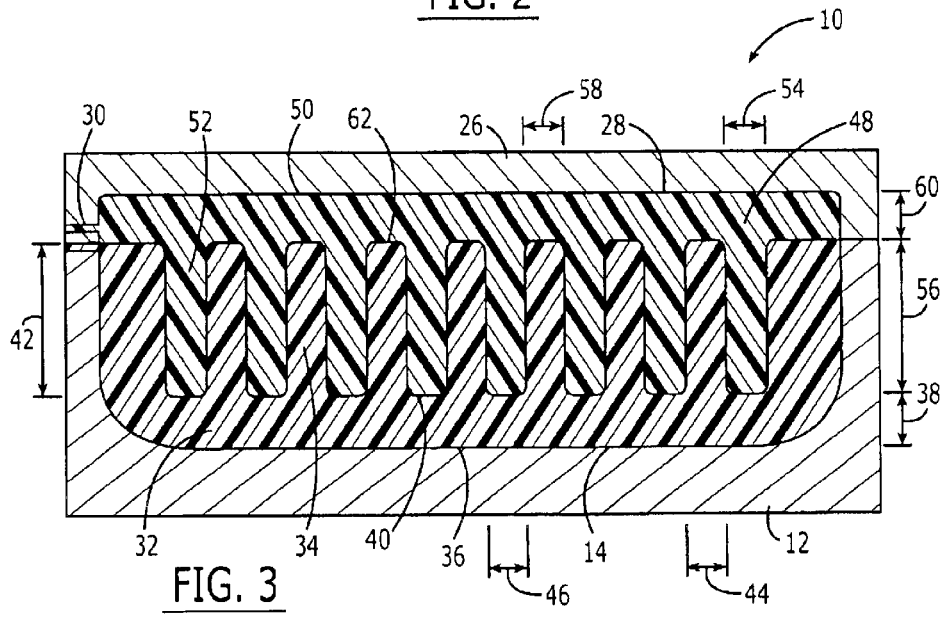
FIG. 3 is a cross sectional view of a mold according to the invention with a part being molded according to the method of the invention.

FIG. 2 is a cross sectional view of a second core mold portion 26 which is also removably engagable with cavity mold portion 12 in place of the first core mold portion 16 (see FIG. 3). Similar to the cavity mold portion 12, the second core mold portion 26 has an inner surface 28 shaped as required to produce a surface of a molded part having the desired shape characteristics for its intended function. Second core mold portion 26 also has a gate 30 to admit moldable material in fluid form to mold 10 when the second core mold portion is engaged with the cavity mold portion.

Mold 10 is used in the method according to the invention by engaging the first core mold portion 16 with the cavity mold portion 12 as shown in FIG. 1 and then filling the mold with a moldable material in fluid form, for example, molten polycarbonate thermoplastic injected through gate 24. When the material hardens, it produces a first form 32, shown in cross section in FIG. 3 and in perspective in FIG. 4. First form 32 has a plurality of ribs 34 integrally molded with the form and complementary to the strakes 18, the ribs 34 thus being arranged in spaced relation to one another. Preferably ribs 34 are dimensioned so that significant shrinkage depressions do not form in the outer surface 36 of the first form 32. The outer surface 36 is formed when the moldable material conforms with the inner surface 14 of the cavity mold portion 12. If the part being formed is a lens, for example, then the surface shape of the part must be maintained within acceptable limits to ensure proper refraction performance.

Depressions in outer surface 36 due to shrinkage can be prevented by sizing and spacing ribs 34 in proportion to the thickness 38 of the first form 32, the thickness 38 being measured generally perpendicularly to the outer surface 36 of the form 32 and defined as the distance between a surface 40 conforming to the free edges 22 of strakes 18 and the outer surface 36. Preferably the ribs have a depth 42 of less than about 5 times the thickness 38. Rib depths between about 2.5 to about 3 times the thickness 38 are feasible. The thickness 44 of the ribs 34 is preferably between about 0.4 to about 0.8 times the form thickness 38. The rib spacing 46 is preferably between about 2 to about 3 times the form thickness 38. As the ribs 34 are formed as complements to the strakes 18 the strakes must have dimensions which are compatible with the desired rib dimensions. This accounts for the preferred rib dimensions as described above.

The preferred dimensions for the ribs to prevent surface depression due to shrinkage are obtained from *Plastic Part Design for Injection Molding* by Robert A. Malloy, Copyright Hanser Publishing, 1994, pages 222–223.

Figure 4:
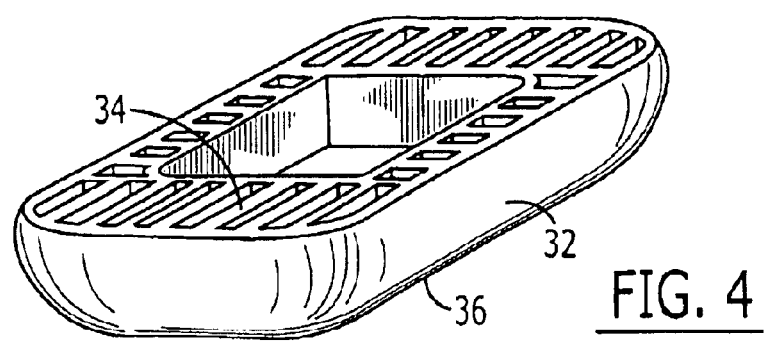
FIG. 4 is a perspective view of an incomplete part as it would appear during molding of the part according to the invention.

FIG. 4 shows form 32 as it would appear if it were removed from cavity mold portion 12. As one object of the invention is to form a thick molded part free of significant surface distortion due to shrinkage however, form 32 is allowed to remain in cavity mold portion 12, the first core mold portion 16 is removed, and the second core mold portion 26 is engaged with cavity mold portion 12 as shown in FIG. 3. The moldable material, for example the polycarbonate thermoplastic, is injected into mold 10 through gate 30 and hardens into a second form 48. Second form 48 has an outer surface 50 which conforms with inner surface 28 of the second mold core portion 26. Again, the shape is chosen based on the functional requirements of the part being made. For the lens example, the outer surface 50 is shaped to provide the proper refractive properties in conjunction with outer surface 36 of the first form 32.

Before it hardens second form 48 has integral ribs 52 whose thickness 54, depth 56 and spacing 58 are preferably proportional to the second form thickness 60 using the same or similar relationships as specified above for the ribs 34 associated with the first form 32. The ribs 52 form in the spaces between the ribs 34 of the first form, the first form 32 thus acting as part of the mold for the second form. Thickness 60 of the second form 48 is defined as the perpendicular distance between outer surface 50 and the ends 62 of ribs 32. Again, the relationship between the preferred rib dimensions and the form thickness 60 ensures that outer surface 50 will conform to the shape of inner surface 28 as desired and will not be distorted by localized surface depressions due to shrinkage as the material hardens.

Figure 5:
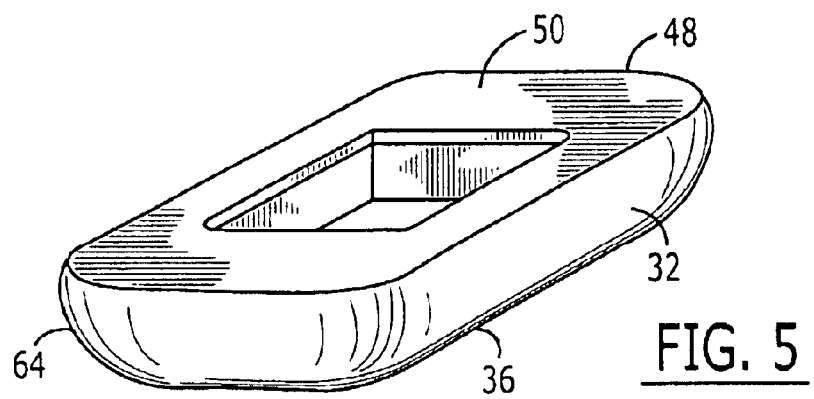
FIG. 5 is a perspective view of a completed part molded according to the invention.

During the process of injecting the moldable material into mold 10 in making the second form 48 (FIG. 3) the ribs 52 fuse with the ribs 34 yielding the desired thick part 64 which is shown removed from the mold in FIG. 5. Part 64 comprises the first and second forms 32 and 48 fused together in a substantially homogeneous mass, there being no discernable interfaces indicating where ribs 52 and 34 had been.

Part 64, despite being a thick molded part, has no significant localized depressions in either of its outer surfaces 50 and 36 because the part was molded according to the method of the invention using ribs sized in proportion to the thickness of the forms 32 and 48 to ensure that no significant shrinkage will occur as the moldable material solidifies. Part 64 is thus suitable for use as a refracting lens since its shape, defined by its outer surfaces 36 and 50, does not deviate significantly from the shape needed to achieve the desired refraction of electromagnetic waves, and the mass of the part between the outer surfaces is substantially homogeneous due to the compatibility of the moldable material used to create the first and second forms 32 and 48.

The method of molding thick parts according to the invention economically produces thick parts free of surface distortions that would normally occur if such a part were molded in a simple cavity mold in one step. Parts molded according to the process are thus suitable for use in applications such as refracting lenses, where significant surface or shape distortion due to shrinkage is undesirable. The process produces parts economically because it allows for a reduced cycle time in the curing or hardening of the part since the part is allowed to harden in two stages with only a portion of the total mass of the part hardening at any one time. The time saving is significant since the cycle time is geometrically proportional to the mass of the molded material, thus a modest reduction in the mass yields a significant reduction in cycle time, increasing production rates and decreasing costs.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of molding a part from a moldable material, said method comprising the steps of:

providing a cavity mold portion having a first inner surface;

providing a first core mold portion engagable with said cavity portion, said first core portion having a plurality of strakes positioned in spaced relation to one another and oriented substantially perpendicularly to said first inner surface, said strakes having a free edge positionable in spaced relation to said first inner surface when said first core portion is engaged with said cavity portion;

engaging said first core portion with said cavity portion to form a mold;

filling said mold with the moldable material in a fluid form;

allowing the moldable material to harden, said moldable material conforming to said mold into a first form with a plurality of first ribs formed as complements of said strakes, said first ribs being integral with said first form and separated from one another by a plurality of spaces formed by said strakes;

removing said first core portion;

providing a second core mold portion engagable with said cavity portion, said second core portion having a second inner surface;

engaging said second core portion with said cavity portion to form said mold;

filling said mold with the moldable material in a fluid form, the moldable material filling said spaces thereby forming a plurality of second ribs and conforming to said second inner surface into a second form integral with said second ribs;

allowing the moldable material to harden, said first and second ribs being fused to one another joining said first and second forms together to form the part, the part being substantially homogeneous between said first and second surfaces;

removing said second core portion; and removing the part from said cavity portion.

2. A method of molding a part according to claim 1, wherein said first and second forms each have a respective thickness measured generally perpendicularly to said first and second inner surfaces respectively.

3. A method of molding a part according to claim 2, wherein said first ribs have a depth of less than about 5 times the thickness of said first form.

4. A method of molding a part according to claim 3, wherein said first ribs have a depth between about 2.5 and about 3 times the thickness of said first form.

5. A method of molding a part according to claim 3, wherein said first ribs have a spacing between about 2 to about 3 times the thickness of said first form.

6. A method of molding a part according to claim 5, wherein said first ribs have a thickness of about 0.4 to about 0.8 times the thickness of said first form.

7. A method of molding a part according to claim 6, wherein said second ribs have a depth of less than about 5 times the thickness of said second form.

8. A method of molding a part according to claim 7, wherein said second ribs have a depth between about 2.5 and about 3 times the thickness of said second form.

9. A method of molding a part according to claim 7, wherein said second ribs have a spacing between about 2 to about 3 times the thickness of said second form.

10. A method of molding a part according to claim 9, wherein said second ribs have a thickness of about 0.4 to about 0.8 times the thickness of said second form.

* * * * *